United States Patent
Zhu et al.

(10) Patent No.: US 11,886,320 B2
(45) Date of Patent: Jan. 30, 2024

(54) DIAGNOSING APPLICATION PROBLEMS BY LEARNING FROM FAULT INJECTIONS

(71) Applicant: NeurOps Inc., Mountain View, CA (US)

(72) Inventors: Xiaoyun Zhu, Cupertino, CA (US); Pradeep Padala, Sunnyvale, CA (US); Nathaniel Morris, Columbus, OH (US); David Lee, Foster City, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 16/906,768

(22) Filed: Jun. 19, 2020

(65) Prior Publication Data
US 2021/0397538 A1 Dec. 23, 2021

(51) Int. Cl.
G06F 11/36 (2006.01)

(52) U.S. Cl.
CPC ........ *G06F 11/3612* (2013.01); *G06F 11/366* (2013.01); *G06F 11/3624* (2013.01); *G06F 11/3636* (2013.01)

(58) Field of Classification Search
None
See application file for complete search history.

(56) References Cited

U.S. PATENT DOCUMENTS

| | | | | |
|---|---|---|---|---|
| 6,622,264 B1* | 9/2003 | Bliley | ................ | G06F 11/2257 714/37 |
| 8,706,451 B1* | 4/2014 | Gross | ................ | G06F 11/3055 703/2 |
| 10,338,993 B1* | 7/2019 | Lekivetz | ............ | G06F 11/0709 |
| 10,423,514 B1* | 9/2019 | Padidar | ................ | H04W 4/60 |
| 10,684,940 B1* | 6/2020 | Kayal | ................ | G06F 11/3664 |
| 10,719,301 B1* | 7/2020 | Dasgupta | ................ | G06F 8/33 |
| 10,891,219 B1* | 1/2021 | Dimitropoulos | .... | G06F 11/3476 |
| 11,341,410 B1* | 5/2022 | Johnson | ................ | G06N 5/01 |
| 2003/0055666 A1* | 3/2003 | Roddy | ................ | G07C 5/008 705/305 |
| 2003/0204508 A1* | 10/2003 | Cantu-Paz | ........... | G06K 9/6282 |

(Continued)

FOREIGN PATENT DOCUMENTS

WO WO-2021130486 A1 * 7/2021

OTHER PUBLICATIONS

Guo Y, Liu S, Li Z, Shang X. BCDForest: a boosting cascade deep forest model towards the classification of cancer subtypes based on gene expression data. BMC Bioinformatics. 2018;19(Suppl 5):118. Published Apr. 11, 2018. doi:10.1186/s12859-018-2095-4 (Year: 2018).*

(Continued)

*Primary Examiner* — Andrew M. Lyons
(74) *Attorney, Agent, or Firm* — Jaffery Watson Mendonsa & Hamilton LLP

(57) ABSTRACT

Identifying a likely cause of a problem in an application can include: injecting a series of a set of predetermined faults into the application; sampling a subset of a set of training features from the application during each predetermined fault injected into the application and labeling each subset with an identifier of the corresponding predetermined fault; and training a classifier to identify the likely cause by associating a set of real-time features sampled from the application that pertain to the problem to one or more of the predetermined faults in response to the training features.

20 Claims, 12 Drawing Sheets

(56) References Cited

U.S. PATENT DOCUMENTS

| | | | | |
|---|---|---|---|---|
| 2011/0154109 | A1* | 6/2011 | Levine | G06F 11/0748 714/26 |
| 2013/0097706 | A1* | 4/2013 | Titonis | G06F 21/566 726/22 |
| 2013/0305093 | A1* | 11/2013 | Jayachandran | G06F 11/079 714/37 |
| 2015/0161386 | A1* | 6/2015 | Gupta | G06F 21/44 726/23 |
| 2015/0172307 | A1* | 6/2015 | Borohovski | H04L 63/1408 726/25 |
| 2016/0078695 | A1* | 3/2016 | McClintic | G07C 5/0816 701/29.4 |
| 2017/0068526 | A1* | 3/2017 | Seigel | G06F 11/3409 |
| 2018/0300227 | A1* | 10/2018 | Bergen | G06F 11/008 |
| 2019/0121337 | A1* | 4/2019 | Cohen | F24F 11/00 |
| 2019/0155682 | A1* | 5/2019 | Sinha | G06F 11/1008 |
| 2019/0228319 | A1* | 7/2019 | Gupta | G06N 5/04 |
| 2019/0253328 | A1* | 8/2019 | Kolar | H04L 41/147 |
| 2019/0266070 | A1* | 8/2019 | Bhandarkar | G06F 11/3644 |
| 2019/0294538 | A1* | 9/2019 | Zlatarev | G06N 3/04 |
| 2019/0334794 | A1* | 10/2019 | Halepovic | H04L 43/20 |
| 2019/0340392 | A1* | 11/2019 | Khorrami | G06F 21/52 |
| 2019/0340512 | A1* | 11/2019 | Vidal | G06F 11/3664 |
| 2019/0370473 | A1* | 12/2019 | Matrosov | G06N 3/044 |
| 2020/0012549 | A1* | 1/2020 | Johnsson | G06N 3/088 |
| 2020/0184282 | A1* | 6/2020 | Sutton | G06N 3/0454 |
| 2021/0027181 | A1* | 1/2021 | Roden | G06N 20/00 |
| 2021/0034985 | A1* | 2/2021 | Vongkulbhisal | G06N 3/04 |
| 2021/0042570 | A1* | 2/2021 | Iskandar | G06K 9/6256 |
| 2021/0136097 | A1* | 5/2021 | McClymont, Jr. | H04L 63/1441 |
| 2021/0248618 | A1* | 8/2021 | Ionescu | G06Q 30/016 |

OTHER PUBLICATIONS

Pandey, Panjal, "Data Preprocessing: Concepts", Towards Data Science, Nov. 25, 2019, last retrieved from https://towardsdatascience.com/data-preprocessing-concepts-fa946d11c825 on Nov. 19, 2021 (Year: 2019).*

Altvater, Alexandra, "What is Load Testing? How It Works, Tools, Tutorials, and More," Stackify, Feb. 5, 2021, last retrieved from https://stackify.com/what-is-load-testing/ on Sep. 22, 2022. (Year: 2021).*

G. Bronevetsky, I. Laguna, B. R. de Supinski and S. Bagchi, "Automatic fault characterization via abnormality-enhanced classification," IEEE/IFIP International Conference on Dependable Systems and Networks (DSN 2012), 2012, pp. 1-12, doi: 10.1109/DSN.2012.6263926. (Year: 2012).*

C. Ciccotelli, L. Aniello, F. Lombardi, L. Montanari, L. Querzoni and R. Baldoni, "NIRVANA: A Non-intrusive Black-Box Monitoring Framework for Rack-Level Fault Detection," 2015 IEEE 21st Pacific Rim International Symposium on Dependable Computing (PRDC), 2015, pp. 11-20, doi: 10.1109/PRDC.2015.22. (Year: 2015).*

I. Irrera, M. Vieira and J. Duraes, "Adaptive Failure Prediction for Computer Systems: A Framework and a Case Study," 2015 IEEE 16th International Symposium on High Assurance Systems Engineering, 2015, pp. 142-149, doi: 10.1109/HASE.2015.29. (Year: 2015).*

R. Jia, S. Abdelwahed and A. Erradi, "Towards Proactive Fault Management of Enterprise Systems," 2015 International Conference on Cloud and Autonomic Computing, 2015, pp. 21-32, doi: 10.1109/ICCAC.2015.18. (Year: 2015).*

C. Pham et al., "Failure Diagnosis for Distributed Systems Using Targeted Fault Injection," in IEEE Transactions on Parallel and Distributed Systems, vol. 28, No. 2, pp. 503-516, Feb. 1, 2017, doi: 10.1109/TPDS.2016.2575829. (Year: 2017).*

C. Sauvanaud, K. Lazri, M. Kaâniche and K. Kanoun, "Anomaly Detection and Root Cause Localization in Virtual Network Functions," 2016 IEEE 27th International Symposium on Software Reliability Engineering (ISSRE), 2016, pp. 196-206, doi: 10.1109/ISSRE.2016.32. (Year: 2016).*

A. Vishnu, H. van Dam, N. R. Tallent, D. J. Kerbyson and A. Hoisie, "Fault Modeling of Extreme Scale Applications Using Machine Learning," 2016 IEEE International Parallel and Distributed Processing Symposium (IPDPS), 2016, pp. 222-231, doi: 10.1109/IPDPS.2016.111. (Year: 2016).*

H. Ge, W. Sun, M. Zhao, K. Zhang, L. Sun and C. Yu, "Multi-Grained Cascade AdaBoost Extreme Learning Machine for Feature Representation," 2019 International Joint Conference on Neural Networks (IJCNN), Budapest, Hungary, Jul. 14-19, 2019, pp. 1-8, doi: 10.1109/IJCNN.2019.8851774. (Year: 2019).*

Y. Linfei, L. Zhao, Y. Tao and X. Zhang, "Deep Forest Reinforcement Learning for Preventive Strategy Considering Automatic Generation Control in Large-Scale Interconnected Power Systems," Applied Sciences vol. 8, Nov. 7, 2018, pp. 2185-2203, doi:10.3390/app8112185. (Year: 2018).*

Q. Liu, H. Gao, Z. You, H. Song and L. Zhang, "Gcforest-Based Fault Diagnosis Method For Rolling Bearing," 2018 Prognostics and System Health Management Conference (PHM-Chongqing), Chongqing, China, 2018, pp. 572-577, doi: 10.1109/PHM-Chongqing.2018.00103. (Year: 2018).*

Z.-H. Zhou and J. Feng, "Deep Forest," National Key Laboratory for Novel Software Technology, Nanjing University, China, May 14, 2018, arXiv:1702.08835v3 [cs.LG] (Year: 2018).*

G. Bronevetsky, I. Laguna, B. R. de Supinski and S. Bagchi, "Automatic fault characterization via abnormality-enhanced classification," IEEE/IFIP International Conference on Dependable Systems and Networks (DSN 2012), Boston, MA, USA, 2012, pp. 1-12, doi: 10.1109/DSN.2012.6263926. (Year: 2012).*

Merriam-webster., "Correlation," Merriam-Webster Dictionary, last Retrieved from https://www.merriam-webster.com/dictionary/correlation. on Sep. 23, 2022.

* cited by examiner

DIAGNOSING APPLICATION PROBLEMS BY LEARNING FROM FAULT INJECTIONS

BACKGROUND

An application, e.g., an enterprise software-as-a-service application, can suffer a variety of faults which users of the application can experience as slow or unresponsive service. For example, users of an application can experience slow or unresponsive service when one or more resources that underly the application fail or become overloaded.

Application support personnel can diagnose a problem in an application by employing guesswork or manually examining the logs of the underlying resources of the application one by one until a likely cause of the problem is found. Such intuitive manual trial and error methods for diagnosing a problem can consume time, cost money, and annoy users of an application.

SUMMARY

In general, in one aspect, the invention relates to a diagnostic service for identifying a likely cause of a problem in an application. The diagnostic service can include: a classifier that selects the likely cause from among a set of predetermined faults that may occur when running the application by associating a set of real-time features sampled from the application and that pertain to the problem to each predetermined fault; and a learning service that trains the classifier to associate the real-time features to the predetermined faults using a set of training features obtained by injecting each predetermined fault into the application and sampling a respective subset of the training features during each predetermined fault injected and by labeling each respective subset sampled with the respective predetermined fault.

In general, in another aspect, the invention relates to a method for identifying a likely cause of a problem in an application. The method can include: injecting a series of a set of predetermined faults into the application; sampling a subset of a set of training features from the application during each predetermined fault injected into the application and labeling each subset with an identifier of the corresponding predetermined fault; and training a classifier to identify the likely cause by associating a set of real-time features sampled from the application that pertain to the problem to one or more of the predetermined faults in response to the training features.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
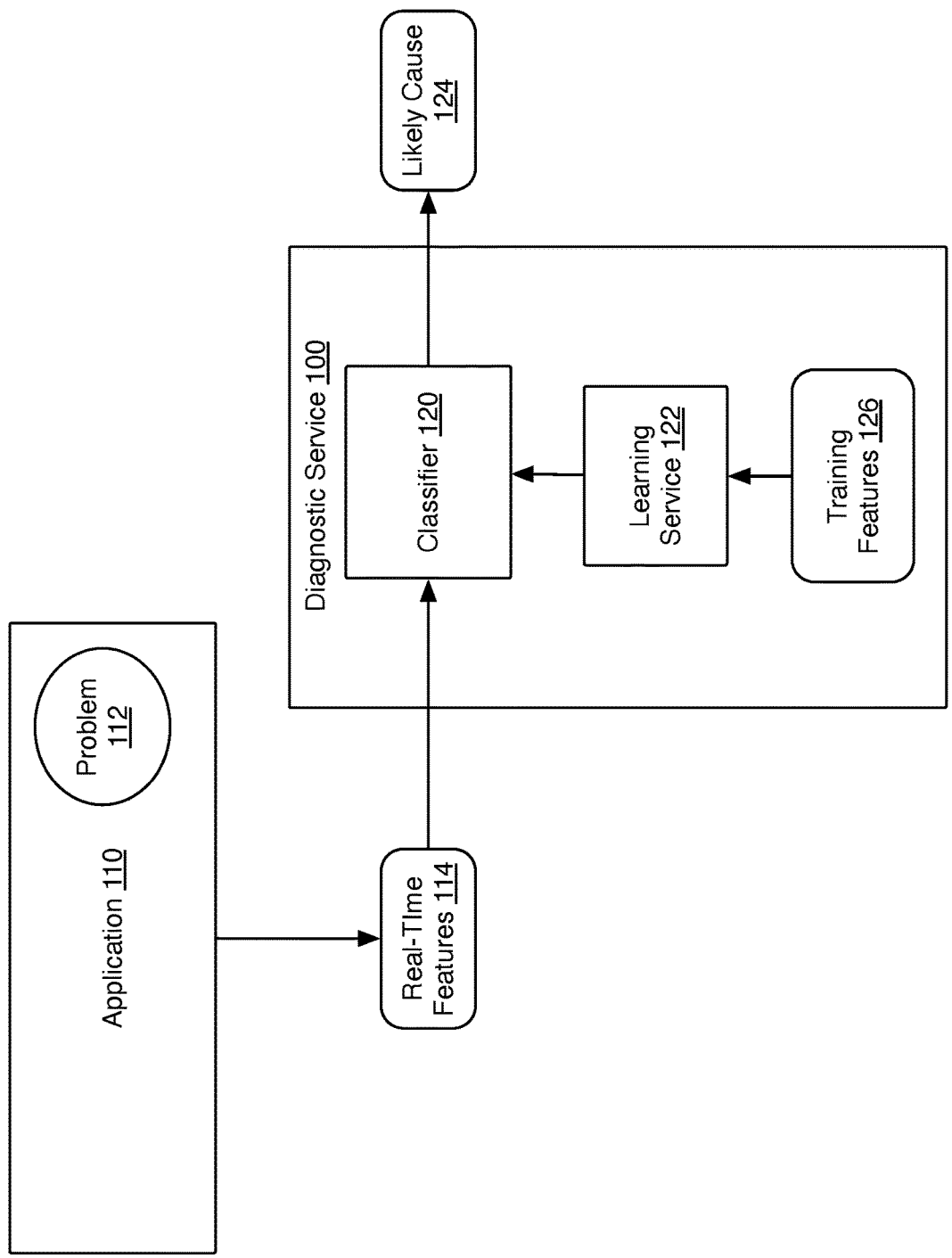
FIG. 1 illustrates a diagnostic service that identifies a likely cause of a problem in an application in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 illustrates a diagnostic service 100 in one or more embodiments. The diagnostic service 100 identifies a likely cause 124 of a problem 112 in an application 110. Examples of the problem 112 include slow response times experienced by users of the application 110, system unavailability experienced by users of the application 110, etc.

The diagnostic service 100 includes a classifier 120 that selects the likely cause 124 from among a set of predetermined faults p1-pN that may occur when running the application 110. The predetermined faults p1-pN can pertain to resources underlying the application 110. Examples of resources that can underly the application 110 include processors, servers, communication mechanisms, storage mechanisms, etc. The resources that underly the application 110 can include any number and arrangement of real resources, e.g., storage drives, network adapters, and virtual resources, e.g., cloud storage, virtual machines.

The classifier 120 associates a set of real-time features 114 sampled from the application 110 and that pertain to the problem 112 to each predetermined fault p1-pN. In one or more embodiments, the classifier 120 includes a set of learned logic, e.g., a neural network, that maps the values of the real-time features 114 as inputs to a respective correlation value for each of the predetermined faults p1-pN as outputs.

In one or more embodiments, the real-time features 114 are sampled from logs normally maintained for the application 110, e.g., usage logs, event logs, error logs, statistical logs, etc. For example, the real-time features 114 can be sampled from respective logs pertaining to processors, servers, communication mechanisms, storage mechanisms, etc., both real and virtual, that underly the application 110.

In one or more embodiments, the real-time features 114 correspond to a time window associated with problem 112. For example, timestamps recorded in the resource logs that underly the application 110 can be used to sample the features that correspond to the time of the problem 112.

The diagnostic service 100 includes a learning service 122 that uses a set of training features 126 labeled with the predetermined faults p1-pN to train the classifier 120. The training features 126 are obtained by injecting each predetermined fault p1-pN into the application 110 and sampling a respective subset of the training features 126 during each predetermined fault p1-pN injected and by labeling each respective subset of the training features 126 sampled with the respective predetermined fault p1-pN.

In one or more embodiments, the training features 126 are sampled from logs normally maintained for the application 110, e.g., event logs, error logs, statistical logs, etc., during a time window that corresponds to the injections of the respective predetermined fault p1-pN. For example, the training features 126 can be sampled from logs pertaining to processors, servers, communication mechanisms, storage mechanisms, etc., both real and virtual, that underly the application 110.

In one or more embodiments, the learning service 122 trains the classifier 120 using supervised learning from the labeled data of the training features 126. Examples of supervised learning in various embodiments include Random Forest, XGBoost, and deep learning algorithms involving Convolutional Neural Networks (CNN). For example, the learning service 122 can derive the parameters of a neural network by learning from the training features 126.

In one or more embodiments, the likely cause 124 is a list of one or more of the predetermined faults p1-pN determined by the classifier 120 to have the highest correlations to the real-time features 114. The list of the likely cause 124 can include a confidence indicator pertaining to each identified one of the predetermined faults p1-pN.

Figure 2:
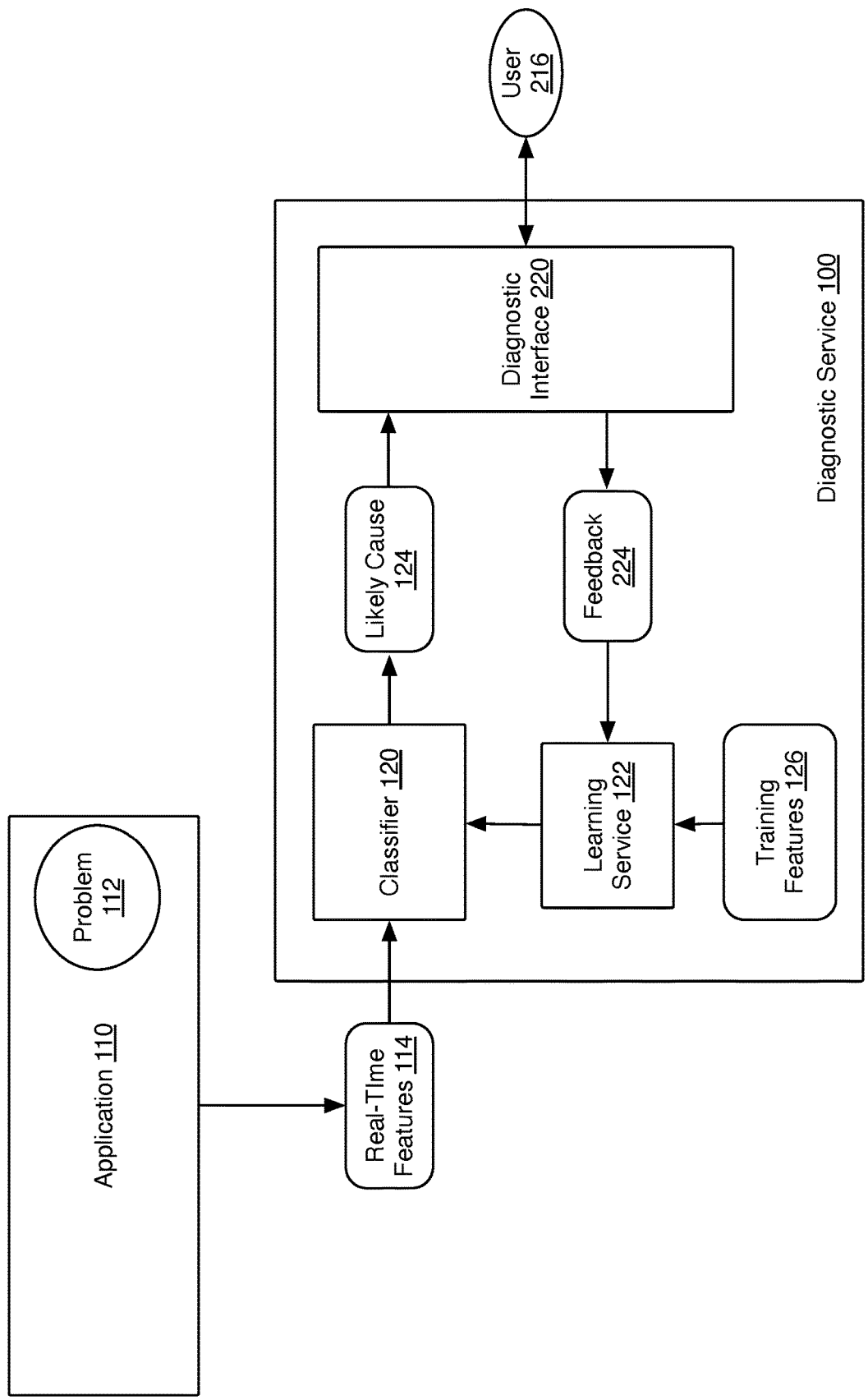
FIG. 2 shows an embodiment of a diagnostic service that includes a diagnostic interface that enables a user to provide feedback pertaining to a diagnosed likely cause.

FIG. 2 shows an embodiment of the diagnostic service 100 that includes a diagnostic interface 220 that enables a user 216 of the diagnostic service 100 to provide a feedback 224 pertaining to the likely cause 124. The feedback 224 in one or more embodiments can include a set of new features sampled from the application 110. The new features of the feedback 224 can include a true fault identified by the user 216 from among the predetermined faults p1-pN. The true fault can be identical to or different from the likely cause 124 identified by the classifier 120 or can be a new fault pN+1. The learning system 122 updates the training of the problem classier 120 in response to the feedback 224.

Figure 3:
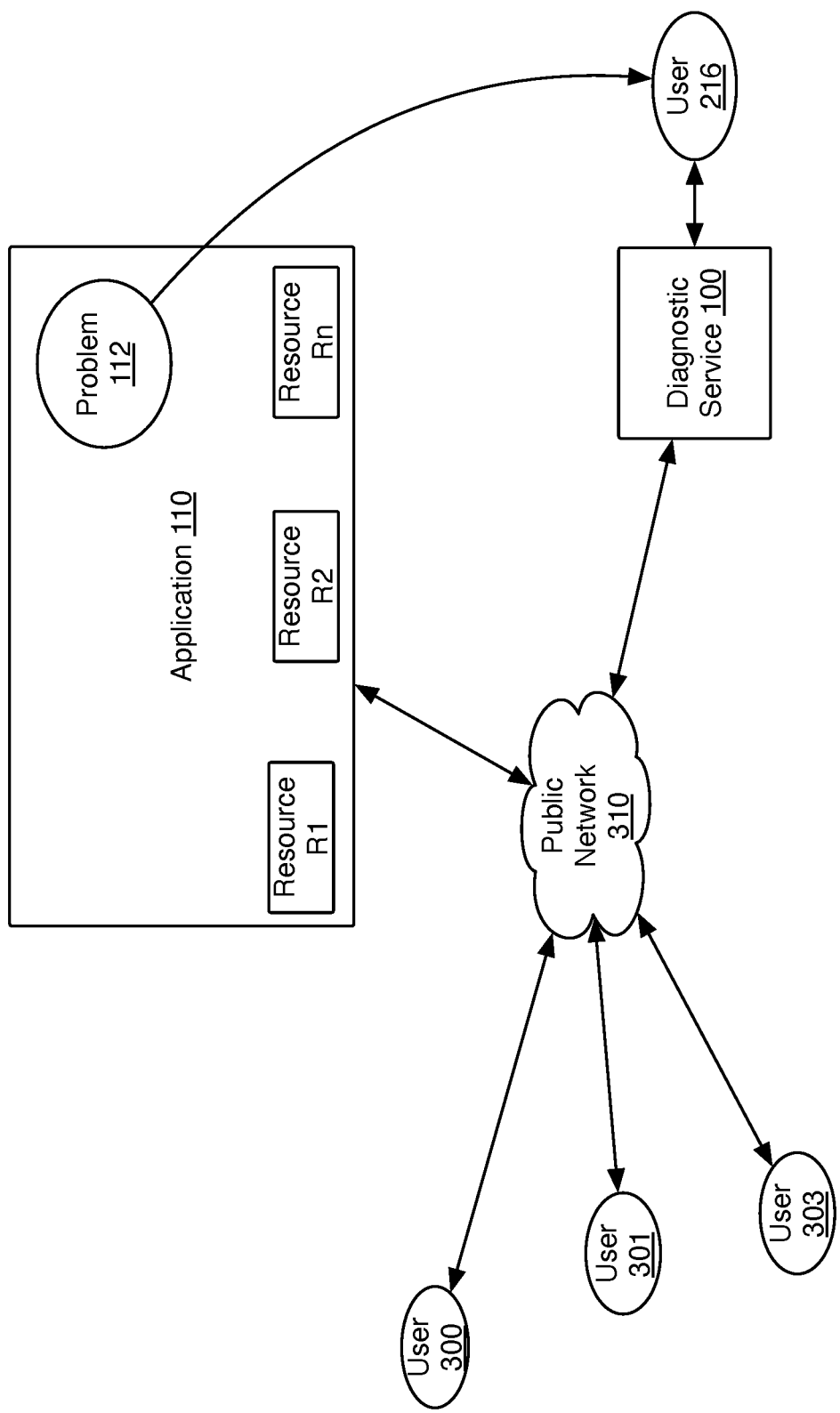
FIG. 3 illustrates an example embodiment in which an application under diagnosis is a software as a service that is accessible online via a public network.

FIG. 3 illustrates an example embodiment in which the application 110 is a software as a service that is accessible online via a public network 310. For example, a set of users 300-303 of the application 110 may be users associated with one or more enterprises who access the application 110, an enterprise application, using internet communication.

The application 110 in this example employs a set of resources R1-Rn while servicing the users 300-303. The resources R1-Rn can include any number and arrangement of, e.g., processor resources, server resources, communication resources, storage resources, etc., with any arrangement of real and virtual resources.

Examples of the predetermined faults p1-pN associated with the resources R1-Rn include a disk filling up, a network partition down, a host down, a storage volume unmounted, a resource bottleneck, a load spike, etc., which are commonly occurring faults in an enterprise application. In the examples below, the resource R1 is a storage resource and the fault p1 is "disk filling up", the resource R2 is a network resource and the fault p2 is "network partition", and the resource Rn is a host resource and the fault pN is "host down".

The user 216 of the diagnostic service 100 obtains a report of the problem 112 via, e.g., one or more messages on the public network 310, and then uses the diagnostic service 100 or other software support service to sample the real-time features 114 via the public network 310. The diagnostic service 100, in turn, presents the likely cause 124 rendered by the classifier 120 in response to the real-time features 114 to the user 216. In some embodiments, the user 216 can access the diagnostic service 100 via the public network 310.

An example of the likely cause 124 presented to the user 216 is a list that includes "disk filling up, 75%", "volume unmounted, 20%", load spike, 4%", where the percentages indicate confidence levels with higher numbers indicating higher confidence based on the training of the classifier 120. The user 216 can provide feedback if, e.g., after investigation, the problem 112 turns out to have been caused by the load spike or some new fault not included in the predetermined faults p1-pN. The user 216 can sample new features from the logs of the resources R1-Rn or from the logs of a new resource so that the training of the classifier 120 can be updated accordingly.

Figure 4:
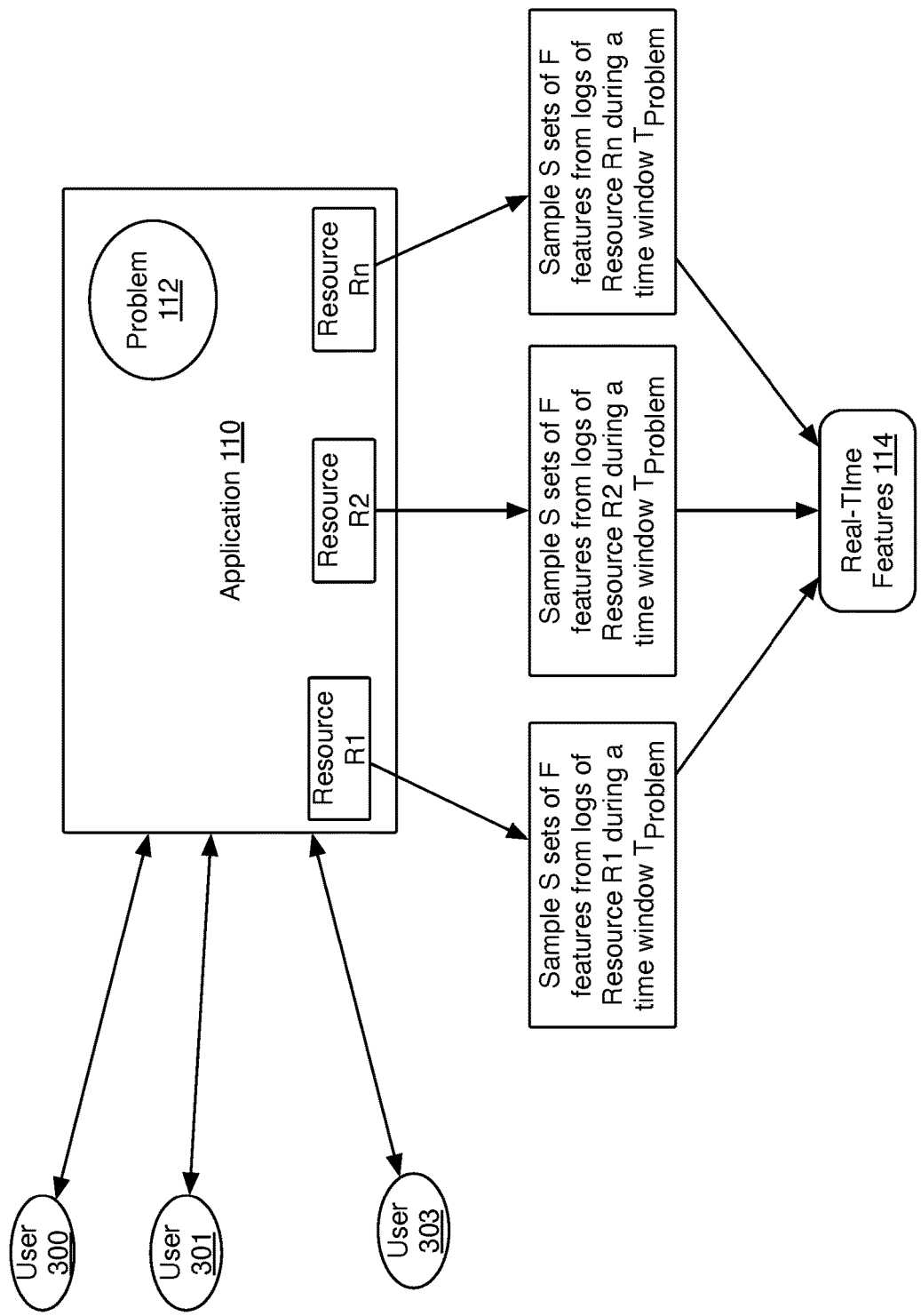
FIG. 4 illustrates how to sample a set of real-time features of a problem in an application in one or more embodiments.

FIG. 4 illustrates how to sample the real-time features 114 of the problem 112 in one or more embodiments. The sampling shown can performed by a person responsible for troubleshooting the problem 112, e.g., the user 216, who can be a software support specialist for the application 110. In some embodiments, the sampling shown can be performed automatically, e.g., by a functionality implemented in the diagnostic service 100, when the problem 112 is reported to the user 216 of the diagnostic service 100.

The real-time features 114 are obtained by sampling S sets of F features for each of the resources R1-Rn from one or more respective logs maintained for the resources R1-Rn. The F features sampled can be real numbers extracted from any of the metrices, events, indicators, etc., normally maintained for the resource R1. The S sets for R1-R3 are sampled for a time window $T_{PROBLEM}$ encompassing an occurrence of the problem 112.

Figure 5:
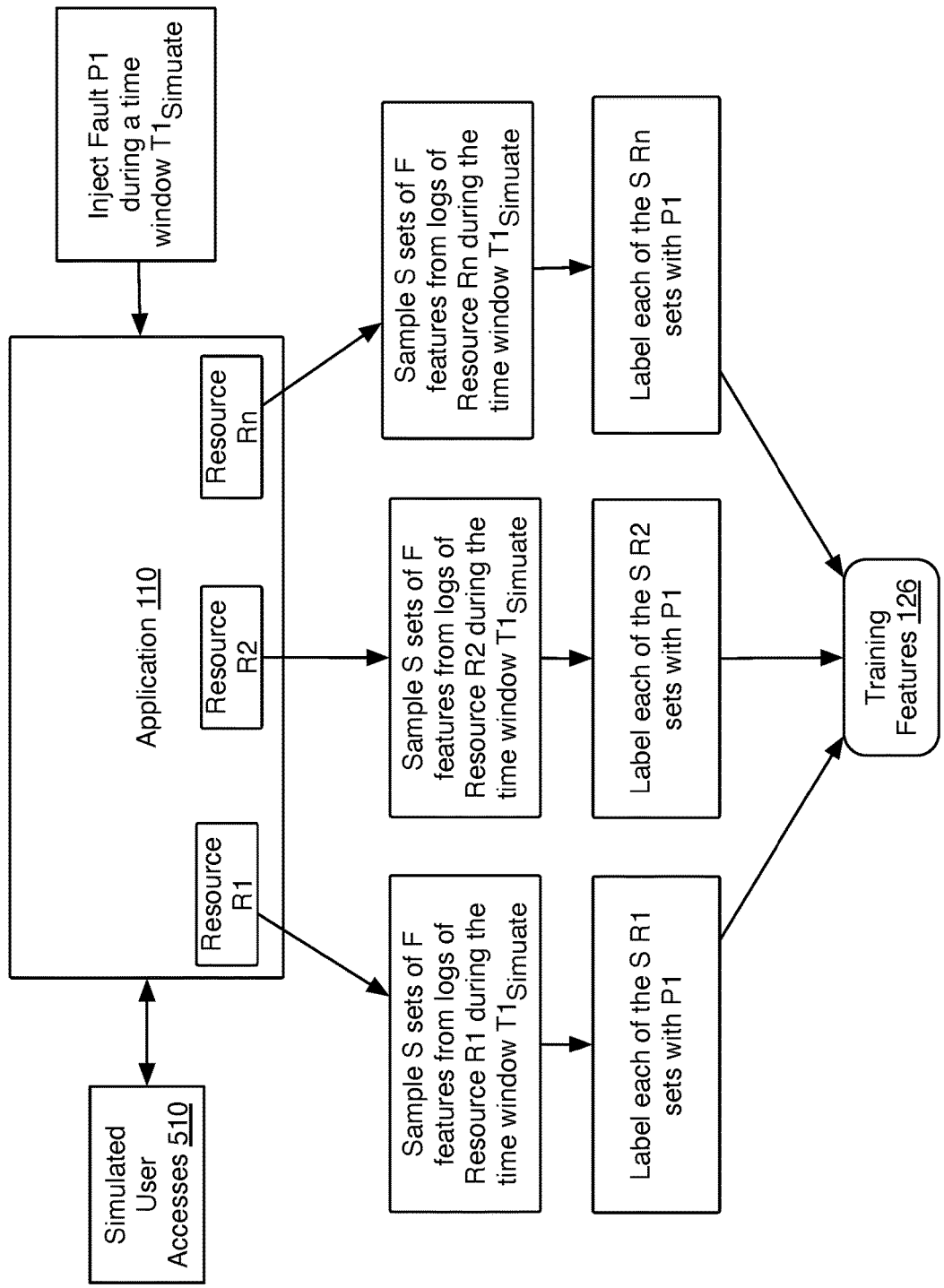
FIGS. 5 through 7 illustrate how to obtain a set of labeled training features for training a classifier to diagnose an application in one or more embodiments.
Figure 6:
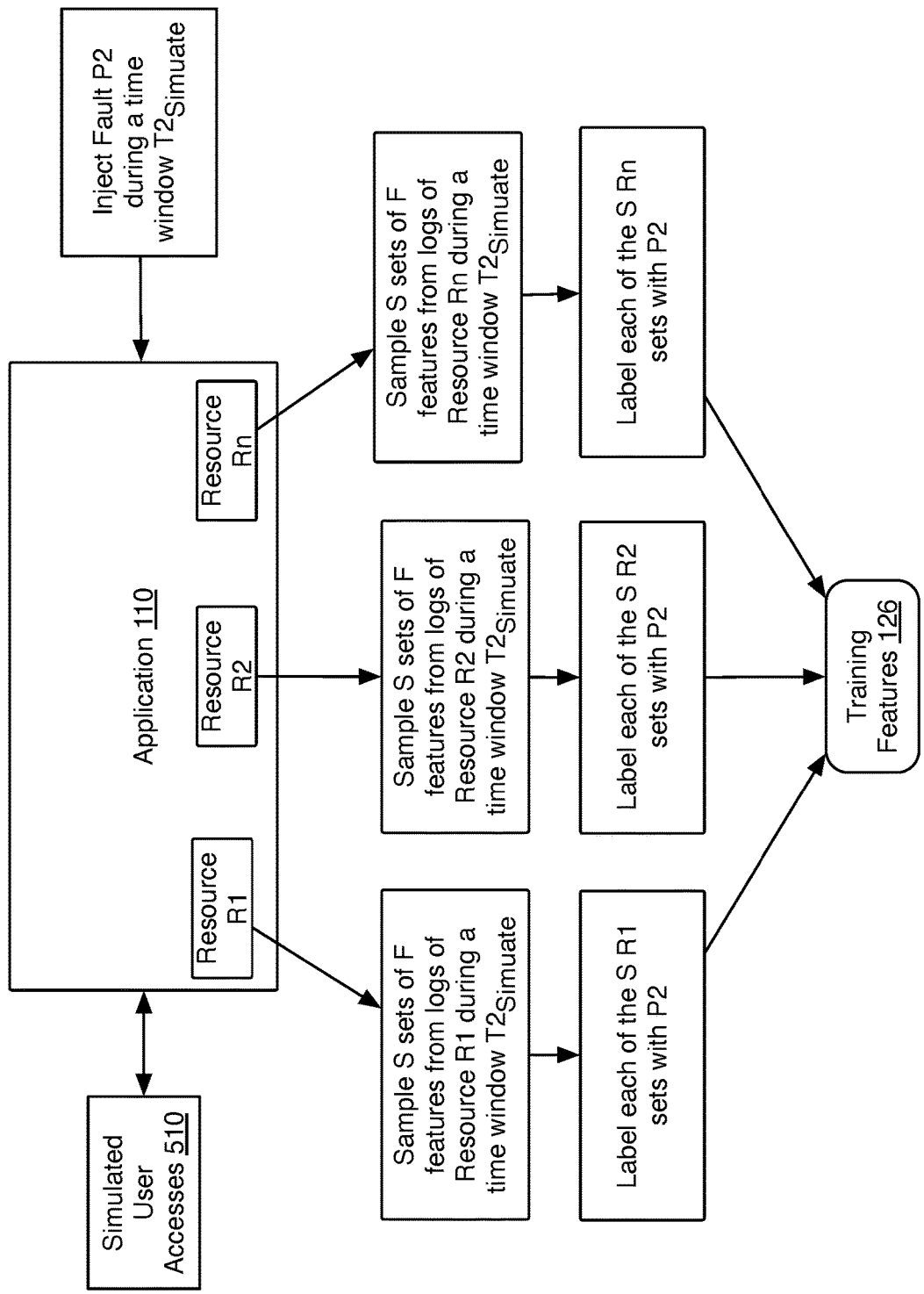
Figure 7:
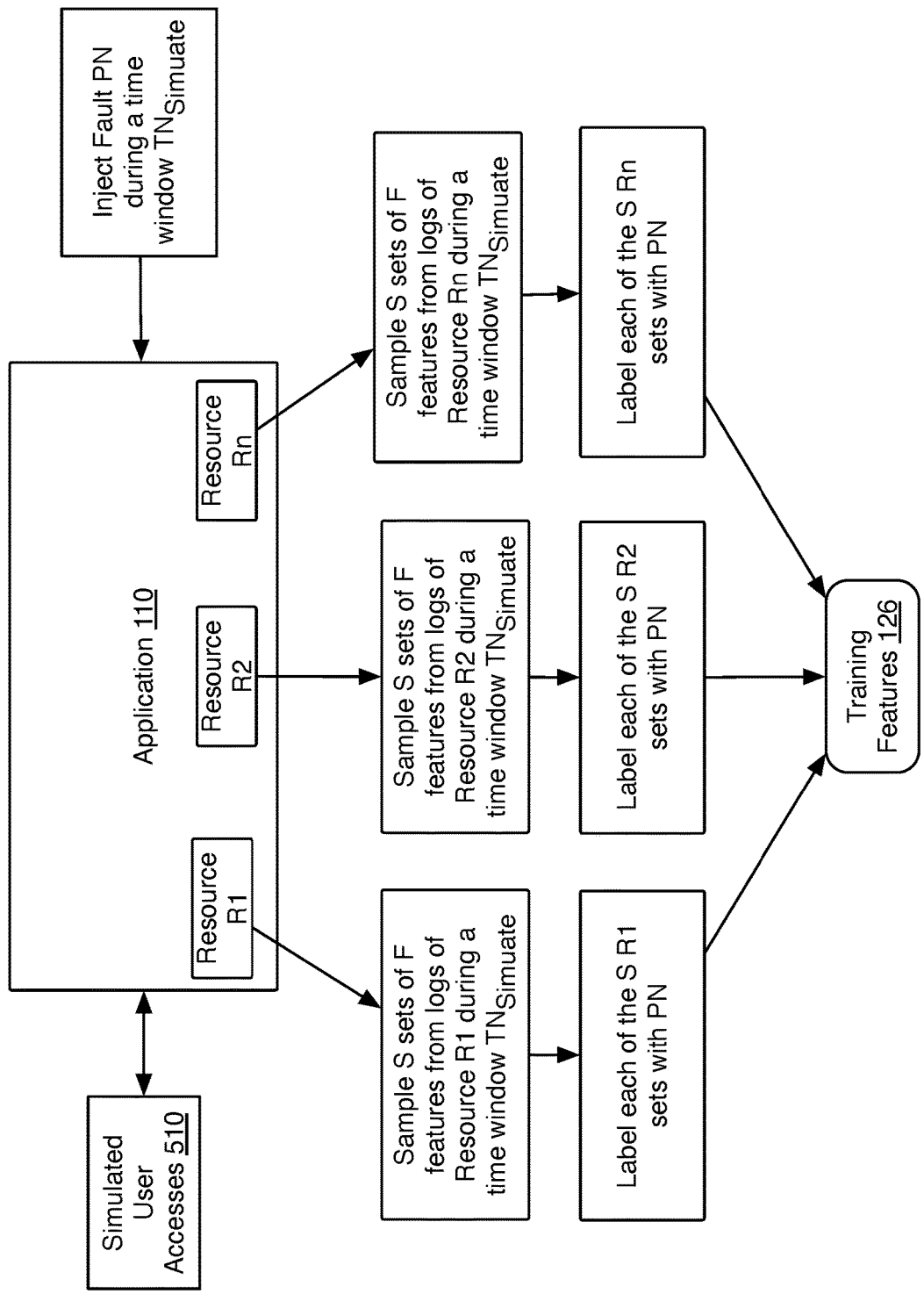

FIGS. 5 through 7 illustrate how to obtain the training features 126 in one or more embodiments. The training features 126 can be obtained, e.g., in a development or staging environment for the application 110 during which time a set of simulated user accesses 510 are applied to the application 110.

The simulated user accesses 510 depend on the nature of the application 110. For example, if the application 110 is a payroll application, the simulated user accesses 510 can include simulated payroll data inputs, outputs, reports, etc., for a large number of simulated users of the payroll application.

FIG. 5 illustrates how to obtain the training features 126 that correspond to an injection of the fault p1 into the application 110 during a time window $T1_{SIMULATE}$. The fault p1 can be injected by, e.g., simulating a disk filling up condition in the disk access code of the resource R1.

The training features 126 that correspond to the injection of the fault p1 are obtained by sampling S sets of F features of each resource R1-Rn from one or more logs maintained for the resources R1-Rn for the time window $T1_{SIMULATE}$ that encompasses the injection of the fault p1. The features sampled for the time window $T1_{SIMULATE}$ can be real numbers extracted from any of the metrics, events, indicators, etc., normally maintained for the resources R1-Rn. Each of the S sets sampled for each R1-Rn are labeled p1 for inclusion in the training features 126.

FIG. 6 illustrates how to obtain the training features 126 that correspond to an injection of the fault p2 into the application 110 during a time window $T2_{SIMULATE}$. The fault p2 can be injected by, e.g., simulating a network partition in the code of the resource R2.

The training features 126 that correspond to the injection of the fault p2 are obtained by sampling S sets of F features of each resource R1-Rn from one or more logs maintained for the resources R1-Rn for the time window $T2_{SIMULATE}$ that encompasses the injection of the fault p2 and labeling each of the S sets sampled for each R1-Rn with p2 for inclusion in the training features 126.

FIG. 7 illustrates how to obtain the training features 126 that correspond to an injection of the fault pN into the application 110 during a time window $TN_{SIMULATE}$. The fault pN can be injected by, e.g., simulating a host down in the code of the resource Rn.

The training features 126 that correspond to the injection of the fault pN are obtained by sampling S sets of F features of each resource R1-Rn from one or more logs maintained for the resources R1-Rn for the time window $TN_{SIMULATE}$ that encompasses the injection of the fault pN and labeling each of the S sets sampled for each R1-Rn with PN for inclusion in the training features 126.

Figure 8A:
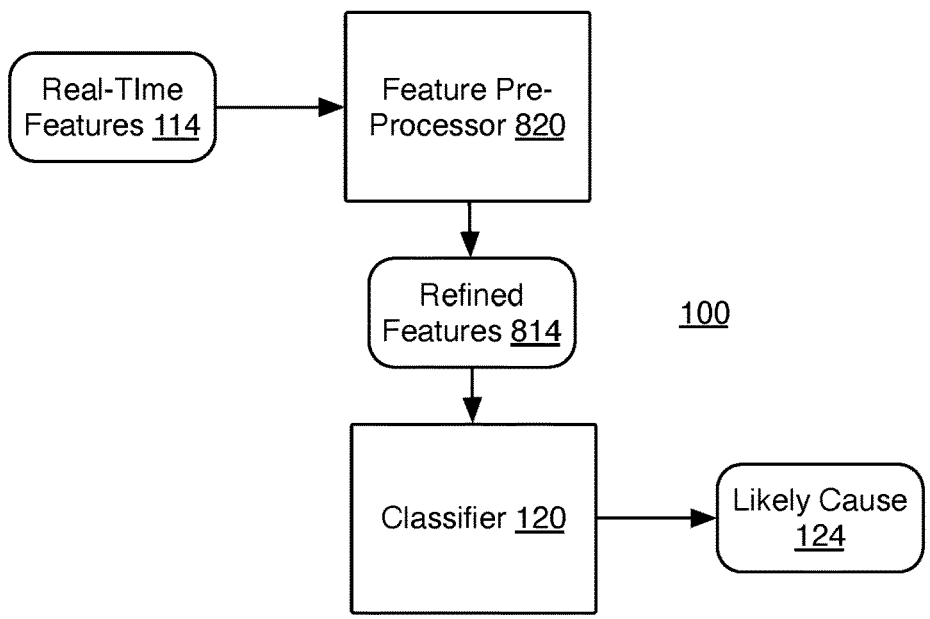
FIGS. 8A-8B illustrate refinement of real-time and training features in one or more embodiments.
Figure 8B:
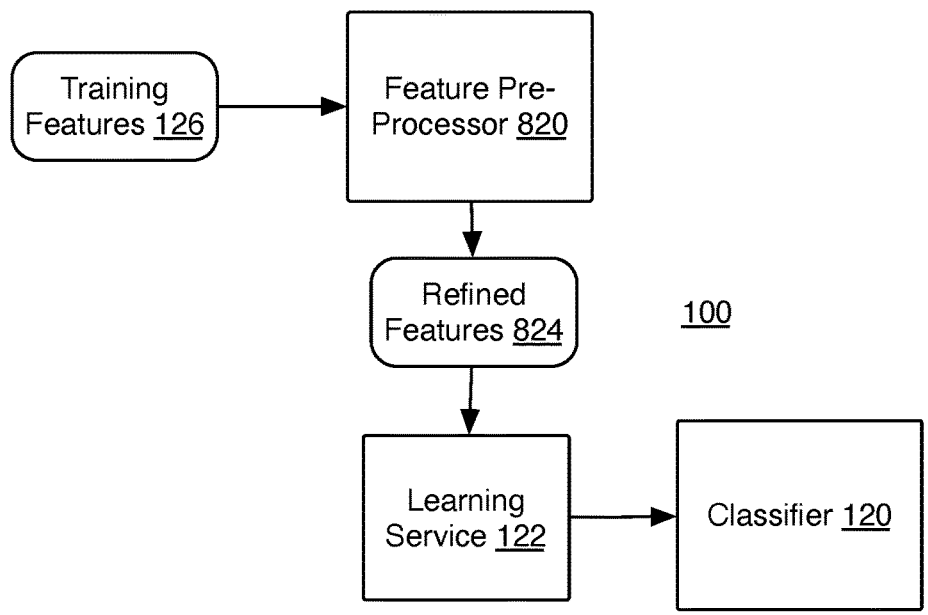

FIGS. 8A-8B illustrate a feature pre-processor 820 in one or more embodiments of the diagnostic service 100. The feature pre-processor 820 refines the raw labeled data sampled from the resources R1-Rn during fault injection and real-time problem diagnosis. FIG. 8A illustrates how the feature pre-processor 820 refines the real-time features 114 into a set of refined features 814 for classification by the classifier 120. FIG. 8B illustrates how the feature pre-processor 820 refines the training features 126 into a set of refined features 824 for use by the learning service 122 to train the classifier 120.

In one or more embodiments, the feature pre-processor 820 refines S sets of F features of raw labeled data by determining a missing value $(\exists s,f \| X_{p(s,f)} \notin \mathbb{R} \wedge (0 \leq s < S) \wedge (0 \leq f < F)$ in the column vector $X_{p(*,f)}$ where f specifies the feature using linear interpolation. For example, if $X_{p(3,2)}$ is missing for feature 2, the tuples $\langle a, X_{p(a,2)} \rangle$ and $\langle b, X_{p(b,2)} \rangle$ can be used to create a line by finding max(a) such that $\exists a \| (0 \leq a < 3) \wedge (X_{p(a,2)} \in \mathbb{R})$ and min(b) such that $\exists b \| (3 < b < S) \wedge (X_{p(b,2)} \in \mathbb{R})$. The values along that line are estimates for the samples between those tuples. The estimated value for sample 3 is assigned to $X_{p(3,2)}$. If an a or b does not exist, the value from the nearest samples is assigned. If all values in a column vector $X_{p(*,f)}$ are missing for feature f, zeros are assigned to $X_{p(*,f)}$.

In one or more embodiments, the feature pre-processor 820 refines S sets of F features of raw labeled data by aggregating multiple instances of a resource type into one feature. The function $Z(X_{p(s,*)})_{m,z}$ returns a vector of values from sample s for features with metric m and resource type z. The values $Z(X_{p(s,*)})_{m,z} \in \mathbb{R}$ are combined by applying the minimum, maximum, and mean to $Z(X_{p(s,*)})_{m,z}$. The result from each statistical operation $Z(X_{p(s,*)})_{m,z} \in \mathbb{R}_{1 \times F} \rightarrow (Z(X_{p(s,*)})_{m,z})_{stat}$ becomes a new feature in $X_p$, while the old features with the metric m and resource type z are removed. The above steps are repeated for all s,m,z. After aggregation, the dimensions of the feature matrix $X_p$ changes to $S \times F^{\wedge}$.

The new features are impervious to resource scaling and preserve the format of the feature vector for any number of instances added or removed.

In one or more embodiments, the feature pre-processor 820 refines S sets of F features of raw labeled data by multi-grain scanning to create new features based on historical data. A window of W×F size captures W samples for F features. The window steps through the samples in the feature matrix $X_p \in \mathbb{R}_{S \times F}$ at a granularity L. For example, the window starts at sample S−1 and moves to sample (S−1)−L for the first step and then to sample (S−1)−2L for the second step. In general, the window moves to sample (S−1)−tL for the tth step. Each step takes W samples within the window and creates a feature vector $n_p \in \mathbb{R}_{1 \times (W \times F)}$ of length W×F in the new feature matrix $N_p$. Multi-grain scanning flattens the window to increase the number of features by W times the original number of features. The scanning process continues until the window reaches the last real valued sample in $N_p$. Any non-real valued samples within the window are assigned zero. Once the multi-grain scanning process completes, the new feature matrix is $N_p \in \mathbb{R}_{S \times (W \times F)}$ and replaces the original feature matrix $X_p$.

In one or more embodiments, the feature pre-processor 820 refines S sets of F features of raw labeled data by Z-score normalization in which the magnitude and the mean for the values of a feature are normalized using z-score. Z-score normalization reduces the error in model training and inference by transforming the values for a feature to the number of standard deviations from the mean. Z-score normalization is applied to each feature f such that $X_{p(*,f)} \in \mathbb{R}_{S \times 1} \rightarrow (X_{p(*,f)})_{zscore}$. The offline version computes the z-score using the mean and standard deviation of the collected data. The online version computes the z-score by tracking the running mean and the estimated running standard deviation to have similar reduction in model error.

Figure 9:
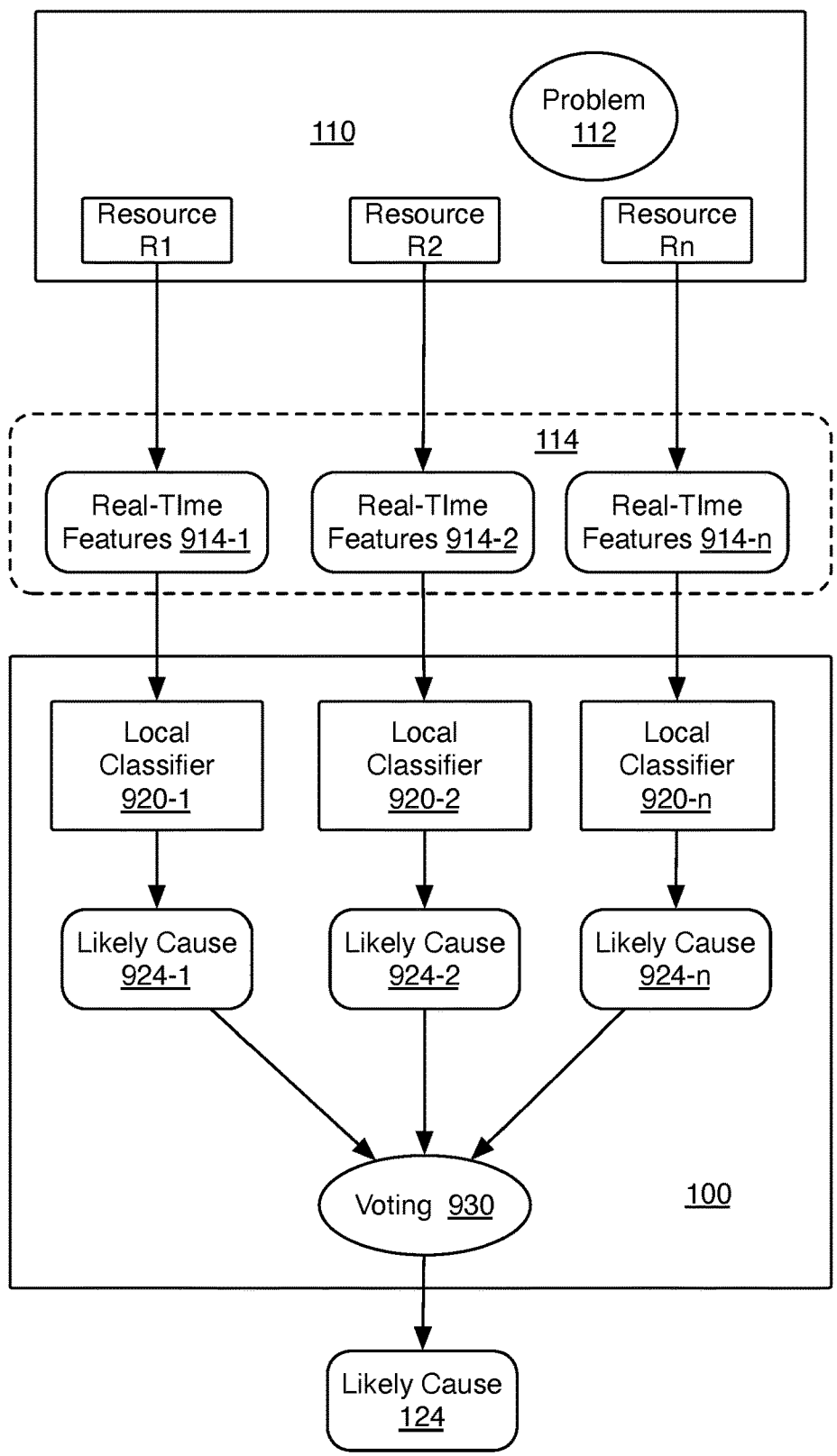
FIG. 9 illustrates an ensemble of local classifiers in one or more embodiments.

FIG. 9 illustrates an embodiment in which the classifier 120 includes an ensemble of local classifiers 920-1 through 920-$n$, each respectively adapted to classifying respective local sets of real-time features 914-1 through 914-$n$ sampled respectively from the resources R1-Rn of the application 110. For example, the real-time features 914-1 are features sampled from the resource R1 during $T_{PROBLEM}$, and the real-time features 914-2 are features sampled from the resource R2 during $T_{PROBLEM}$.

The local classifiers 920-1 through 920-$n$ determine a respective likely cause 924-1 through 924-$n$ of the problem 112 in response to the respective sets of real-time features 914-1 through 914-$n$, and a voting step 930 selects the likely cause 124 from among the likely causes 924-1 through 924-$n$. For example, if n=10 and 7 of 10 of the likely causes 924-1 through 924-$n$ indicate fault p3, then the voting step 930 selects fault p3 as the likely cause 124.

The diagnostic service 100 can determine the likely cause 124 based on any subset of the local classifiers 920-1 through 920-$n$. For example, if n=10 and, at the time of the problem 112, feature samples are available from R1, R3, R4, R7, and R9 only, then the voting step 930 selects the likely cause 124 from among the likely causes 924-1, 924-3, 924-4, 924-7, and 924-9 only. Such a condition might occur, for example, when the resources R1-Rn are services offered in a cloud environment, e.g., compute service, storage system, network load balancing service, database services, caching services, messaging services, etc. Different feature data can be collected from each of these different services.

Figure 10:
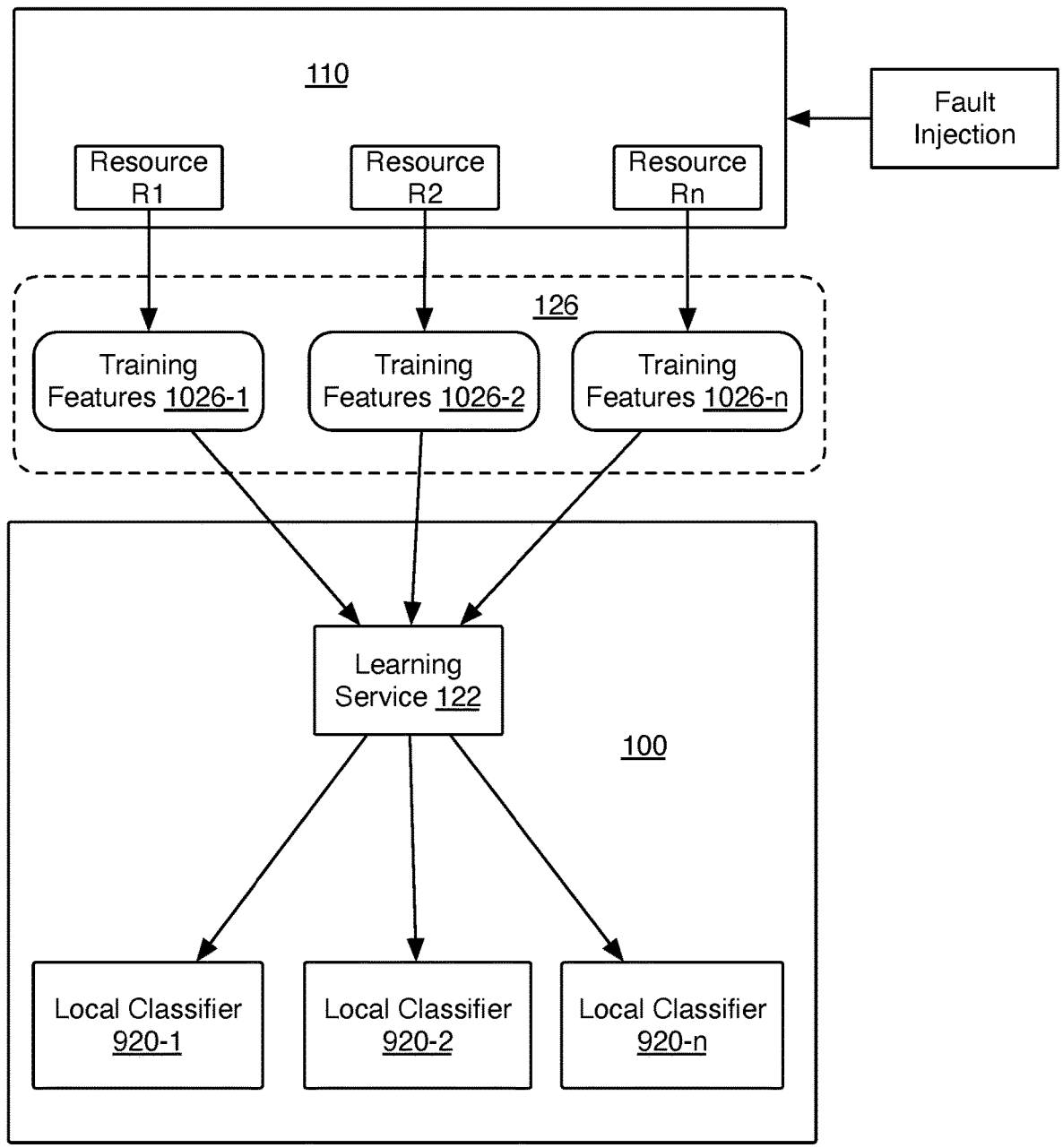
FIG. 10 illustrates training an ensemble of local classifiers in one or more embodiments.

FIG. 10 illustrates how the ensemble of local classifiers 920-1 through 920-$n$ are trained with respective sets of training features 1026-1 through 1026-$n$ sampled from the resources R1-Rn of the application 100 during fault injection. The learning service 122 trains the local classifier 920-1 with the training features 1026-1, and trains the local classifier 920-2 with the training features 1026-2, and trains the local classifier 920-n with the training features 1026-n.

Figure 11:
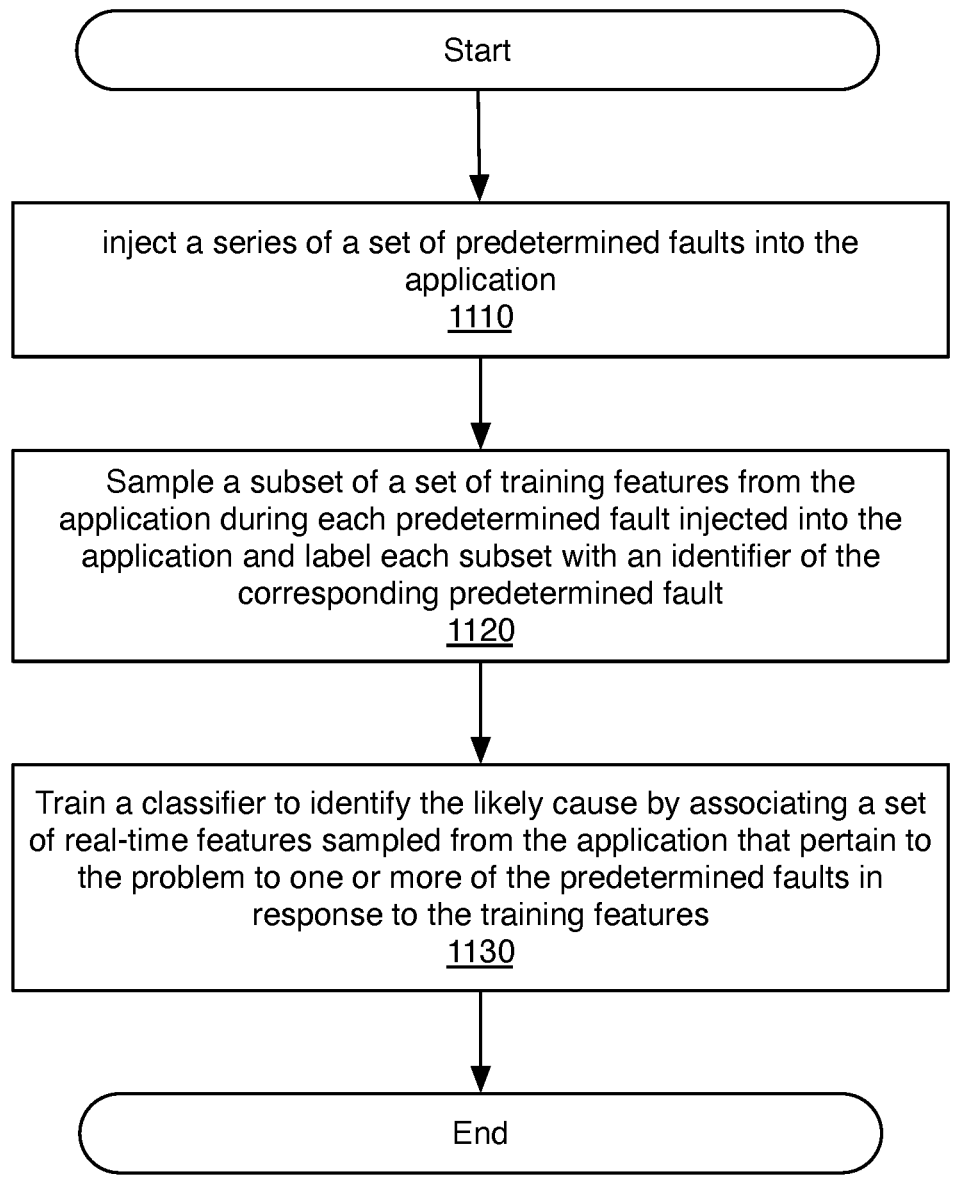
FIG. 11 illustrates a method for identifying a likely cause of a problem in an application in one or more embodiments.

FIG. 11 illustrates a method for identifying a likely cause of a problem in an application in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 11 should not be construed as limiting the scope of the invention.

At step 1110, a series of a set of predetermined faults are injected into the application. The predetermined faults can be preselected from expert knowledge, histories of problems, etc., as faults that may occur in the application and cause the problem experienced by users of the application. The predetermined faults can pertain to faults that may occur in a variety of resources upon which the application runs.

At step 1120, a subset of a set of training features are sampled from the application during each predetermined fault injected into the application and each subset is labeled with an identifier of the corresponding predetermined fault. There can be any number of samples of the features in each subset and there can be any number of features.

At step 1130, a classifier is trained to identify the likely cause by associating a set of real-time features sampled from the application that pertain to the problem to one or more of the predetermined faults in response to the training features. The training can be supervised learning from the labeled training features. The likely cause can identify one or more of the predetermined faults as a likely cause of the problem along with a confidence indicator for the likeliness of the identified predetermined fault.

Figure 12:
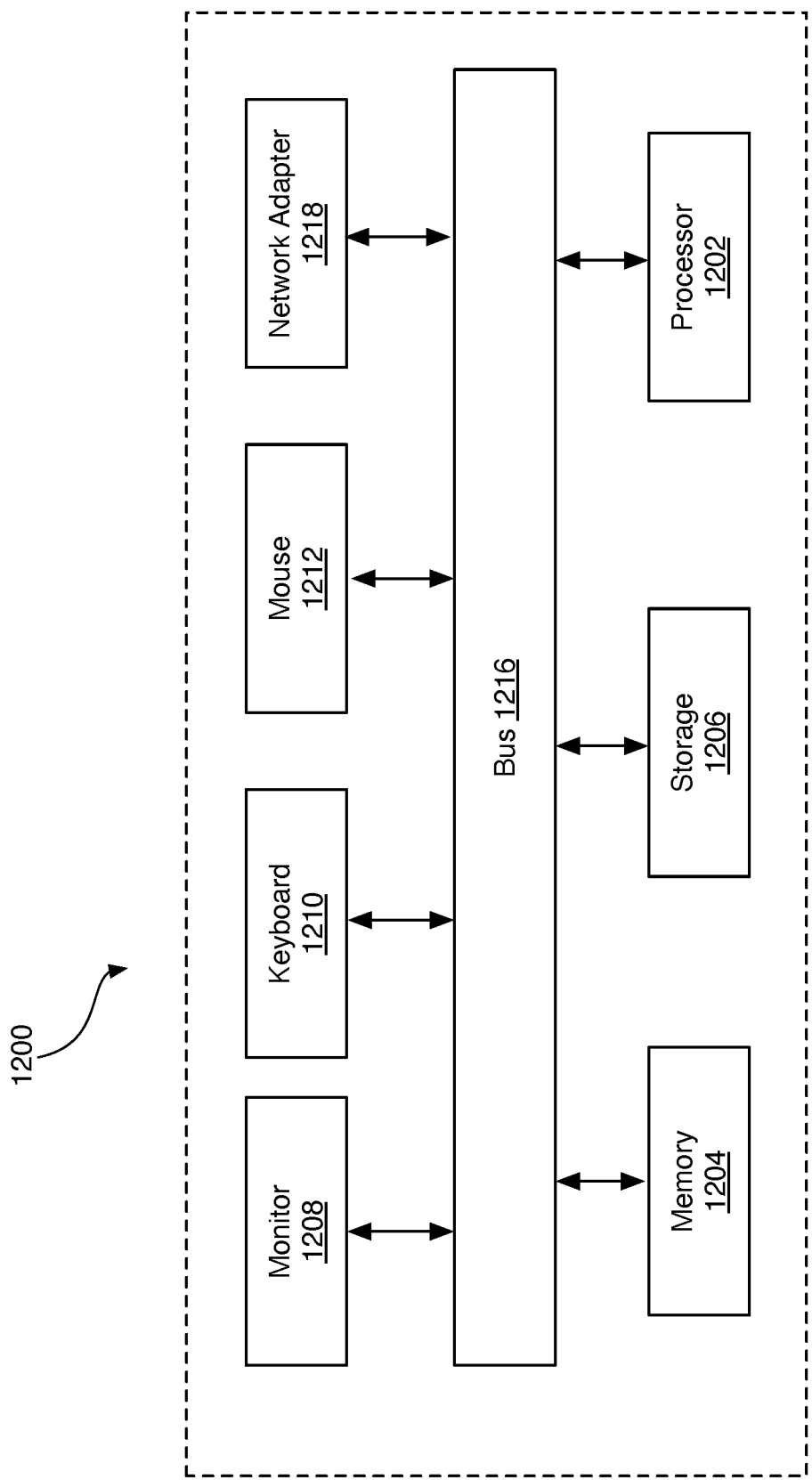
FIG. 12 illustrates a computing system upon which portions of a diagnostic service can be implemented.

FIG. 12 illustrates a computing system 1200 upon which portions of a diagnostic service 100 can be implemented. The computing system 1200 includes one or more computer processor(s) 1202, associated memory 1204 (e.g., random access memory (RAM), cache memory, flash memory, etc.), one or more storage device(s) 1206 (e.g., a hard disk, an optical drive such as a compact disk (CD) drive or digital versatile disk (DVD) drive, a flash memory stick, etc.), a bus 1216, and numerous other elements and functionalities. The computer processor(s) 1202 may be an integrated circuit for processing instructions. For example, the computer processor(s) may be one or more cores or micro-cores of a processor. The computing system 1200 may also include one or more input device(s), e.g., a touchscreen, keyboard 1210, mouse 1212, microphone, touchpad, electronic pen, or any other type of input device. Further, the computing system 1200 may include one or more monitor device(s) 1208, such as a screen (e.g., a liquid crystal display (LCD), a plasma display, touchscreen, cathode ray tube (CRT) monitor, projector, or other display device), external storage, input for an electric instrument, or any other output device. The computing system 1200 may be connected to network (e.g., a local area network (LAN), a wide area network (WAN) such as the Internet, mobile network, or any other type of network) via a network adapter 1218.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A method for diagnosing a problem in an application, comprising:
obtaining a set of real-time features sampled from the application corresponding to a time when a set of real users of the application experienced the problem in the application; and
obtaining a likely cause of the problem in the application by applying the obtained set of real-time features to a classifier that has been pre-trained for recognizing a set of predetermined faults that may occur in the application based on a previous injection of a series of the predetermined faults into the application that occurred while a set of simulated user accesses providing at least simulated user inputs were applied to the application and while a set of training features for training the classifier were sampled from the application in a development or staging environment, wherein the pre-training is based on multiple time windows each having one or more faults injected into the application and, for each of the multiple time windows, sample sets of features from each of multiple resources within the application are extracted from corresponding logs and labeled with corresponding time window information and used as training information to generate refined sets of features corresponding to the problem in the application from multi-grain scanning to create new features corresponding to the problem in the application based on historical data utilizing a window size corresponding to a step having a pre-selected number of samples for which a feature vector is generated and multi-grain scanning is utilized to flatten each window and increase a number of features corresponding to the problem in the application for the corresponding window.

2. The method of claim 1, further comprising generating a list of one or more of the predetermined faults having highest correlations to the real-time features of the problem.

3. The method of claim 2, further comprising determining a respective confidence indicator for each predetermined fault on the list.

4. The method of claim 1, further comprising refining the training features and the real-time features by interpolating one or more missing values in the training features and the real-time features before training the classifier.

5. The method of claim 1, further comprising refining the training features and the real-time features by aggregating multiple instances of a resource type for the application into one feature in the training features and the real-time features before training the classifier.

6. The method of claim 1, further comprising refining the training features and the real-time features by normalizing the training features and the real-time features before training the classifier.

7. The method of claim 1, further comprising training an ensemble of local classifiers in the classifier, each local classifier adapted for the real-time features associated with a respective subset of resources upon which the application runs, and obtaining the likely cause in response to a classification vote among the local classifiers.

8. The method of claim 1, further comprising obtaining a new set of features sampled from the application that pertain to one of the predetermined faults and updating the classifier in response to the new set of features.

9. The method of claim 1, further comprising obtaining a new set of features sampled from the application that pertain to a new fault discovered in the application and updating the classifier in response to the new set of features.

10. A computing system to diagnose a problem in an application, the computing system comprising:
   a storage device;
   a hardware processor coupled with the storage device, the hardware processor and storage device to provide:
      a classifier pre-trained to recognize a set of predetermined faults that may occur in the application based on an injection of a series of the predetermined faults into the application during a previous training while a set of simulated user accesses providing at least simulated user inputs were applied to the application and while a set of training features were sampled from the application in a development or staging environment, wherein the pre-training is based on multiple time windows each having one or more faults injected into the application and, for each of the multiple time windows, sample sets of features from each of multiple resources within the application are extracted from corresponding logs and labeled with corresponding time window information and used as training information to generate refined sets of features corresponding to the problem in the application from multi-grain scanning to create new features corresponding to the problem in the application based on historical data utilizing a window size corresponding to a step having a pre-selected number of samples for which a feature vector is generated and multi-grain scanning is utilized to flatten each window and increase a number of features corresponding to the problem in the application for the corresponding window; and
      a diagnostic service to apply the classifier to a set of real-time features sampled from the application when a set of real users of the application experienced the problem in the application such that the classifier yields a likely cause of the problem in the application in response to the real-time features.

11. The computing system of claim 10, wherein the classifier is further configured to generate a list of one or more of the predetermined faults having highest correlations to the real-time features of the problem.

12. The computing system of claim 11, wherein the classifier is further configured to determine a respective confidence indicator for each predetermined fault on the list.

13. The computing system of claim 10, further comprising a learning service that refines the training features and the real-time features by interpolating one or more missing values in the training features and the real-time features before training the classifier.

14. The computing system of claim 10, further comprising a learning service that refines the training features and the real-time features by aggregating multiple instances of a resource type for the application into one feature in the training features and the real-time features before training the classifier.

15. The computing system of claim 10, further comprising a learning service that refines the training features and the real-time features by normalizing the training features and the real-time features before training the classifier.

16. The computing system of claim 10, wherein the classifier comprises an ensemble of local classifiers, each local classifier adapted for the real-time features associated with a respective subset of resources upon which the application runs such that the classifier determines the likely cause using a classification vote among the local classifiers.

17. The computing system of claim 10, further comprising a diagnostic interface that obtains a new set of features sampled from the application that pertain to one of the predetermined faults and a learning service that updates the classifier in response to the new set of features.

18. The computing system of claim 10, further comprising a diagnostic interface that obtains a new set of features sampled from the application that pertain to a new fault discovered in the application and a learning service that updates the classifier in response to the new set of features.

19. A computational environment for diagnosing a problem in an application, the computational environment comprising:
   an application having multiple resources, wherein a set of one or more real-time features is extracted from each of the multiple resources of the application during a time window during which the problem exists;
   a diagnostic service commutatively coupled with the application, the diagnostic service having a local classifier corresponding to each of the multiple resources for which real-time features are extracted, the local classifiers to generate a likely cause for each set of one or more real-time features, the diagnostic service providing a voting mechanism to select one of the likely causes from the local classifiers as an overall likely cause of the problem, wherein at least one of the local classifiers is pre-trained based on multiple time windows each having one or more faults injected into the application and, for each of the multiple time windows, sample sets of features from each of multiple resources within the application are extracted from corresponding logs and labeled with corresponding time window information and used as training information.

20. The computational environment of claim 19 wherein the diagnostic service selected a subset of real-time features and corresponding application resources for subsequent classifications.

* * * * *